(12) United States Patent
Tucker et al.

(10) Patent No.: US 8,745,170 B2
(45) Date of Patent: Jun. 3, 2014

(54) DYNAMIC FILE STREAMING

(75) Inventors: Ruxton J. Tucker, Pleasanton, CA (US);
Bradley R. M. Suinn, Fort Collins, CO (US)

(73) Assignee: Apple Inc., Cupertino, CA (US)

( * ) Notice: Subject to any disclaimer, the term of this patent is extended or adjusted under 35 U.S.C. 154(b) by 559 days.

(21) Appl. No.: 12/754,411

(22) Filed: Apr. 5, 2010

(65) Prior Publication Data

US 2011/0055353 A1 Mar. 3, 2011

Related U.S. Application Data

(60) Provisional application No. 61/237,653, filed on Aug. 27, 2009.

(51) Int. Cl.
*G06F 15/16* (2006.01)

(52) U.S. Cl.
USPC ........... 709/219; 709/224; 709/231; 709/232; 711/154; 711/167; 711/168

(58) Field of Classification Search
USPC ........... 709/219, 231, 232; 711/114, 148, 154
See application file for complete search history.

(56) References Cited

U.S. PATENT DOCUMENTS

| | | | |
|---|---|---|---|
| 5,278,838 A * | 1/1994 | Ng et al. .................... | 714/6.12 |
| 5,867,723 A | 2/1999 | Chin et al. | |
| 6,286,074 B1 * | 9/2001 | Batchelor et al. ............ | 710/305 |
| 6,289,383 B1 | 9/2001 | Rhine | |
| 6,370,163 B1 | 4/2002 | Shaffer et al. | |
| 6,457,041 B1 * | 9/2002 | Hutchison ..................... | 709/203 |
| 6,769,030 B1 | 7/2004 | Bournas | |
| 7,012,893 B2 | 3/2006 | Bahadiroglu | |
| 7,206,805 B1 | 4/2007 | McLaughlin, Jr. | |
| 2003/0200277 A1 * | 10/2003 | Kim .............................. | 709/217 |
| 2005/0052994 A1 * | 3/2005 | Lee ................................ | 370/230 |
| 2006/0026342 A1 * | 2/2006 | Calvignac et al. ............ | 711/105 |
| 2008/0320155 A1 | 12/2008 | Ganapathy et al. | |
| 2009/0172267 A1 * | 7/2009 | Oribe et al. ................... | 711/103 |

OTHER PUBLICATIONS http://bio.research.ucsc.edu/people/moore/publications/Moore_etal_Ecology_08.pdf "Habitat Saturation Drives Thresholds in Stream Subsidies"—University of Washington 2008.*
http://cogprints.org/6555/1/27050954_Camera_Ready.pdf "Threshold Verification Technique for Network Intrusion Detection System" IJCSIS 2009.*

* cited by examiner

*Primary Examiner* — Randy Scott
(74) *Attorney, Agent, or Firm* — Womble Carlyle Sandridge & Rice LLP (57) ABSTRACT

Dynamic file streaming divides a read/write operation into an initial number of requests of an initial size. Each of the initial number of requests is transmitted to a remote data processing system and a read/write performance value and a user interactivity value is determined based on the transmitting. A local data processing system increases the initial number of requests or the initial size by a first factor if the read/write performance value is less than a threshold. The local data processing decreases the initial number of requests or the initial size by a second factor if the user interactivity is less than a second threshold.

16 Claims, 10 Drawing Sheets

DYNAMIC FILE STREAMING

This application claims priority to U.S. Provisional Application No. 61/237,653 filed on Aug. 27, 2009, which provisional application is incorporated herein by reference in its entirety.

FIELD OF THE INVENTION

The field of the invention is generally balancing interactivity with background tasks and more particularly, in one embodiment, balancing kernel availability to user requests with data transmission throughput.

SUMMARY OF THE DESCRIPTION

Embodiments of the invention can use dynamic file streaming. Dynamic file streaming, in one embodiment, divides a read/write operation into an initial number of requests having at least an initial size. Each of the initial number of requests is transmitted to a remote data processing system and a read/write performance value and a user interactivity value is determined based on the transmitting. A local data processing system, in one embodiment, increases the initial number of requests or the initial size by a first factor if the read/write performance value is less than a threshold. The local data processing, in one embodiment, decreases the initial number of requests or the initial size by a second factor if the user interactivity is less than a second threshold.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

The present description includes material protected by copyrights. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc. 2009.

Figure 1:
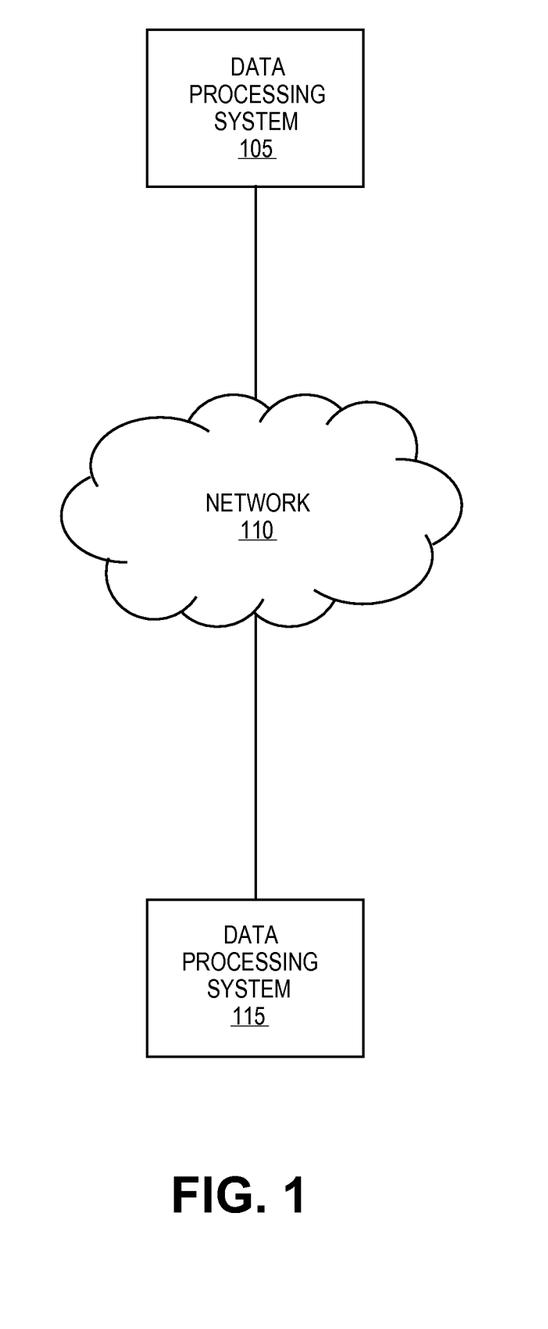
FIG. 1 is a diagram illustrating an environment in which a data processing system may perform an embodiment of a dynamic file streaming method.

FIG. 1 is a diagram illustrating an embodiment of the invention. Data processing system 105 and data processing system 115 are coupled to network 110. In one embodiment, system 105 is a local data processing system such as a desktop computer. System 115 may be a web server or other server system. In another embodiment, systems 105 and 115 are peers communicating using a peer to peer networking system.

System 105 generates a write operation specifying data to be transmitted to system 115 through network 110. Alternatively, system 105 generates a read operation specifying data to be transmitted from system 115 to system 105 through network 110. System 105 divides the read or write operation into one or more read or write requests. The number of requests can be specified by an initial quantum number. In one embodiment, the quantum number specifies how many requests may be transmitted to system 115 before an acknowledgement is received (i.e., an "in-flight" number of requests). The size of each request can be specified by an initial value of a quantum size. Alternatively, the initial size of each request may be selected using other techniques known in the art. Based on the amount of time it takes system 105 to transmit and receive acknowledgement of the requests or received requested data, system 105 calculates a read/write performance value and a user interactivity value. Based on the calculated values, system 105 adjusts the quantum size or the quantum number as described below in greater detail in FIG. 2.

In one embodiment, read/write performance values measure how quickly and efficiently data is being transmitted to or from system 105. Read/write performance may increase in response to an increase in quantum size or quantum number, because more data (quantum size) is transmitted more frequently (quantum number).

By contrast, user interactivity values measure how responsive system 105 is to user requests. In one embodiment, read and write requests are processed by an operating system kernel running on system 105. User requests are also processed by the kernel. As the kernel spends more time processing read and write requests, less time is available to process user requests. This may cause a reduction in user interactivity values, which may be measured in terms of the elapsed time between issuance of a user request and processing of the user request by the kernel.

Maximum and minimum thresholds may be specified for system 105. These thresholds specify the maximum and minimum times the kernel should spend processing a single read or write request. Another pair of thresholds specify the maximum and minimum time the kernel should spend processing a group of read or write requests (e.g., a quantum number of read or write requests). In one embodiment, the system 105 adjusts the quantum size and quantum number after each read or write operation to keep the time spent by the kernel on read or write requests between one or more pairs of thresholds. The thresholds may also be referred to as high and low watermarks, where the water is the time spent by the kernel processing read or write questions.

In one embodiment, quantum size and quantum number are updated using a dynamic file streaming method after each quantum number of requests are transmitted. In another embodiment, quantum size and quantum number are updated after each write or read operation is completed.

Figure 2:
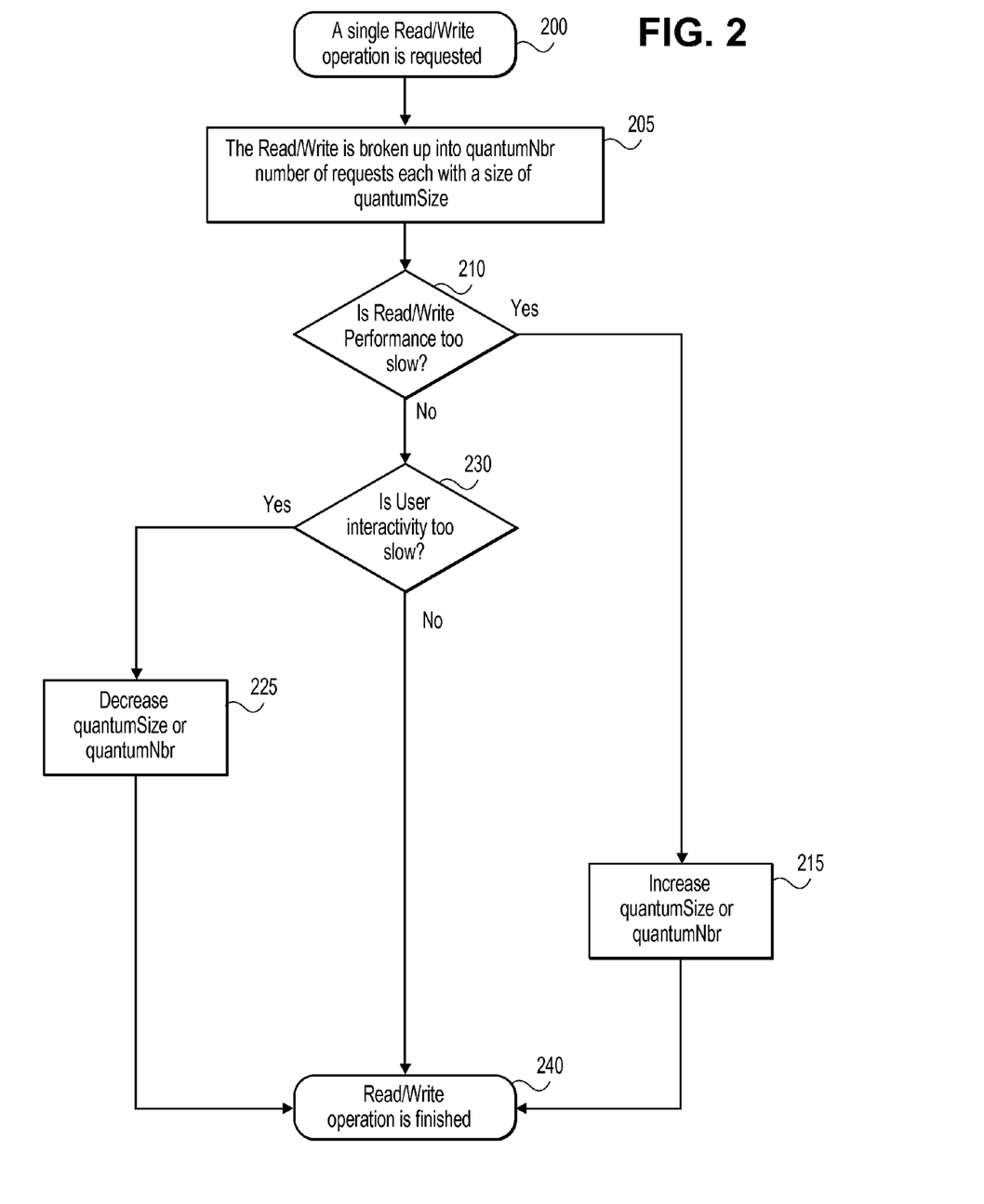
FIG. 2 is a flow diagram illustrating a high level overview of an embodiment of a dynamic file streaming method to be performed by a data processing system.

FIG. 2 is a flow diagram illustrating a high-level overview of a method of dynamic file streaming according to an embodiment of the invention. A data processing system such as system 105 in FIG. 1 may perform the method illustrated in FIG. 2.

At block 200, a single read/write operation is requested. At block 205, the read/write operation is broken up into quantum number of requests each with a size of quantum size. The requests are transmitted to a remote system. If read/write performance is too slow at decision 210, quantum size or quantum number is increased at block 215. Otherwise, if user interactivity is too slow at decision 230, quantum size or quantum number is decreased at block 225. The read/write operation is complete at block 240.

Turning now to FIGS. 3-7 which illustrate a more detailed embodiment of a dynamic file streaming method which may be performed by system 105 of FIG. 1.

Figure 3A:
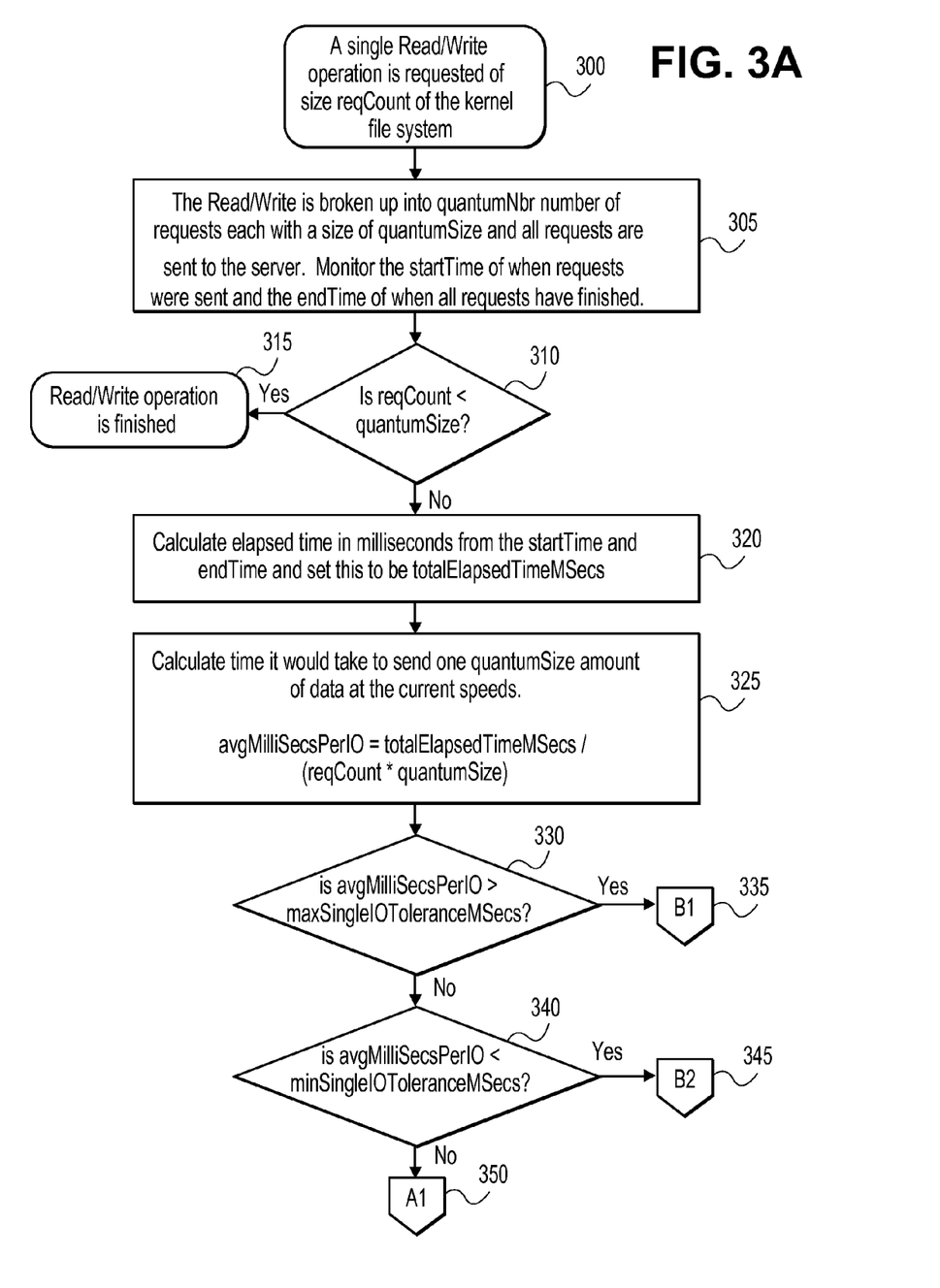
FIGS. 3A-3B are flow diagrams illustrating a more detailed embodiment of a dynamic file streaming method.

At block 300 of FIG. 3A, a single read/write operation is requested of size request count of the kernel file system. At block 305, the read/write operation is broken up into quantum number of requests each with a size of quantum size and all requests are sent to the server. The server may be system 115.

If, at decision 310, the size of the request is less than the quantum size, the read operation is finished at block 315. In the case of block 315, the read or write operation is satisfied by the initial quantum size. Otherwise, the method proceeds to block 320, where the method calculates the elapsed time in milliseconds from a start time (e.g., when the first request was transmitted to the server) until a end time (e.g., when acknowledgement of the quantum number of packets has been received from the server). The difference between the start time and the end time represents the total elapsed time in milliseconds.

At block 325, the method calculates the time it would take to send one quantum size amount of data at the current speed by dividing the total elapsed time by the product of the request count and the quantum size. This value is the average milliseconds per input/output operation. If the average milliseconds per I/O operation is greater than the high water mark for a single I/O operation at decision 330, the method proceeds to block 335, which is described below with regard to FIG. 4. Otherwise, if the average time is less than the low water mark for a single I/O operation at decision 340, the method proceeds to block 345, which is described below with regard to FIG. 5. Otherwise, the method proceeds to block 350, which is described below with regard to FIG. 3B.

Figure 3B:
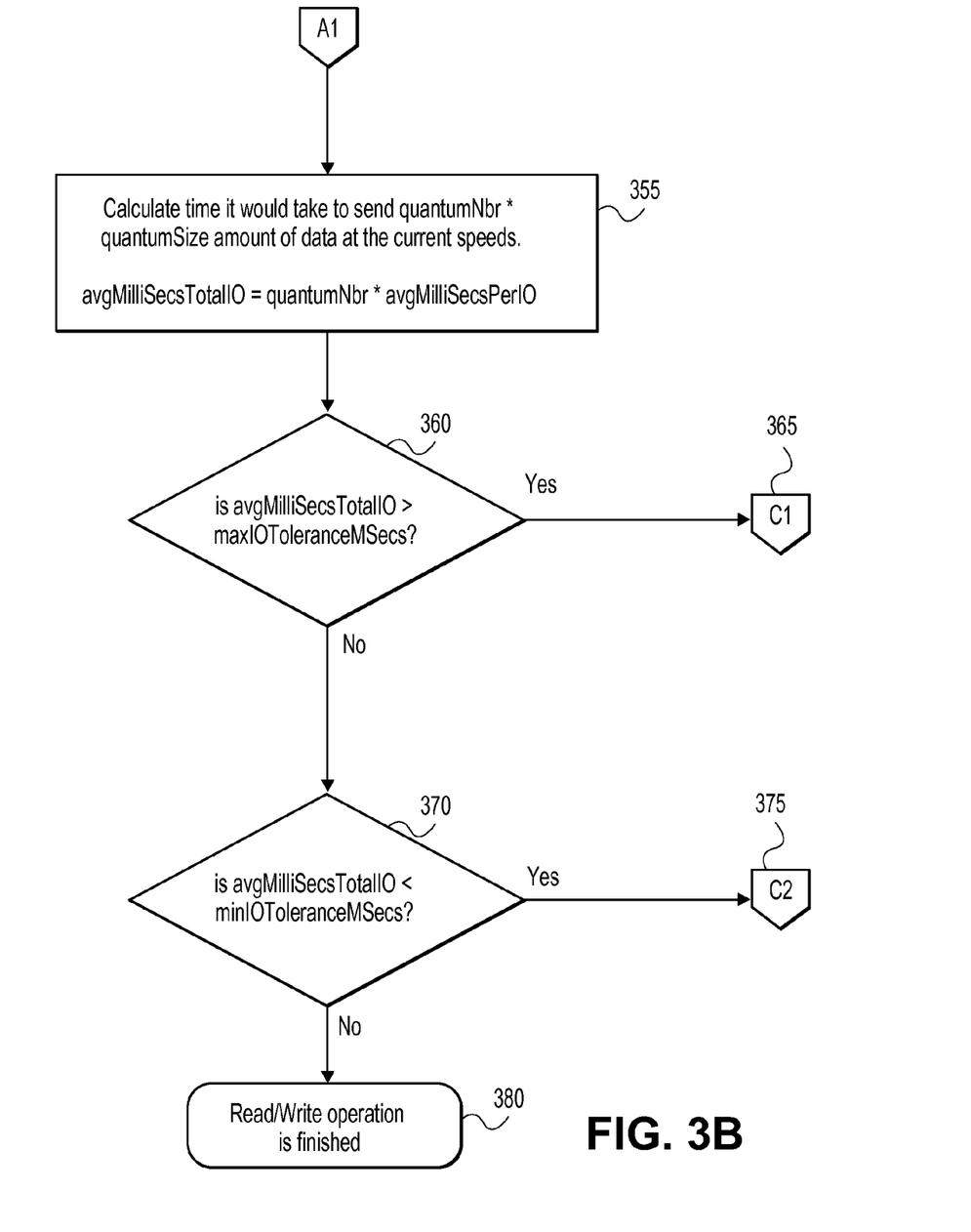

At block 355 of FIG. 3B, the method calculates the time it would take to send the product of quantum number and quantum size amount of data at the current speeds as measured in block 325. The average milliseconds for the total I/O operation (i.e., sending quantum number of requests at the average speed) is calculated by the product of the quantum number and the average milliseconds per I/O operation. If the average total I/O time is greater than the high water mark for total I/O time at decision 360, the method proceeds to block 365, described below in conjunction with FIG. 6. Otherwise, if the average total I/O time is less than the low water mark for total I/O time at decision 370, the method proceeds to block 375, described below in conjunction with FIG. 7. At block 380, the method is complete.

In one embodiment, the minimum and maximum time thresholds are specified by a vendor based on empirical analysis. In another embodiment, the thresholds are configurable by a user. In yet another embodiment, user activity at the system is monitored (e.g., keystrokes, mouse movements, etc.) and the thresholds are adjusted based on the level of user activity (e.g., the tolerance for longer I/O operations is increased if minimal user activity is detected). In still another embodiment, a configuration option is made available to a user allowing the user to indicate a tolerance for delay in interactivity with respect to data throughput (e.g., a slider graphical user interface).

Figure 4:
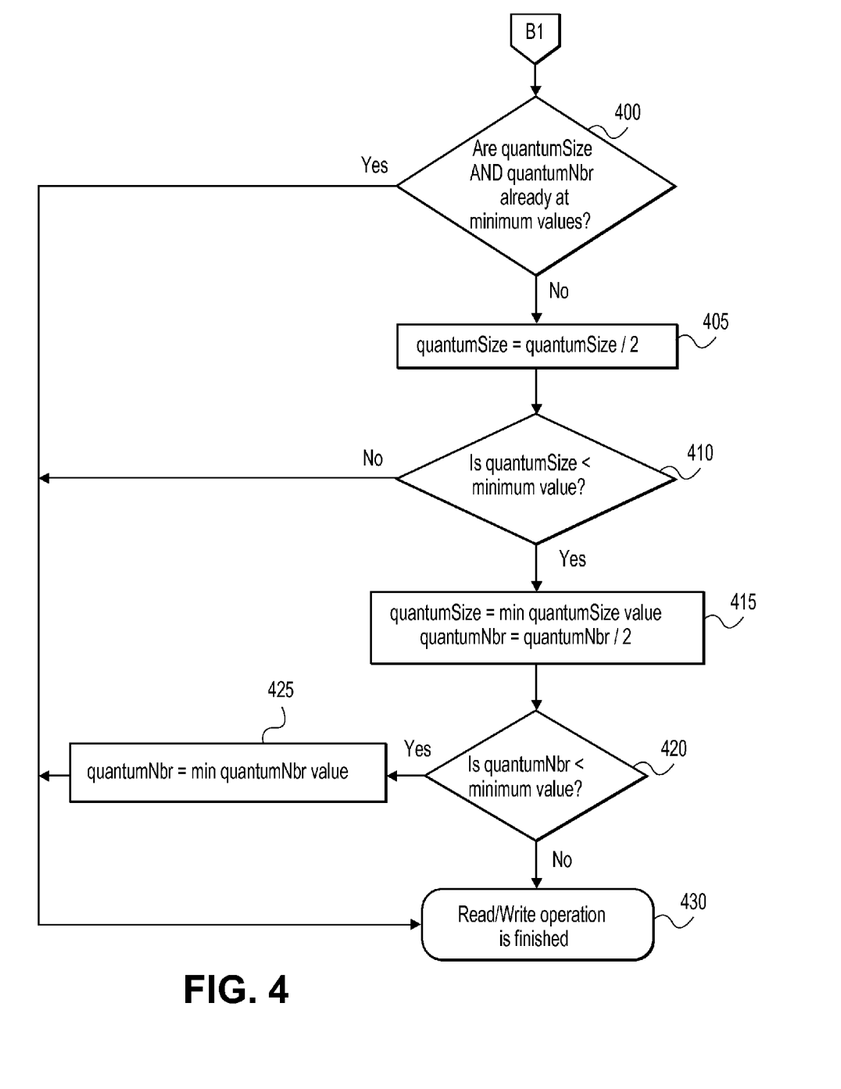
FIGS. 4-7 are flow diagrams illustrating various aspects of a dynamic file streaming method.

FIG. 4 illustrates an embodiment of a dynamic file streaming method in response to an average single I/O operation time exceeding a predetermined high water mark or threshold. If the quantum size and the quantum number are already at minimum predetermined values at decision 400, the method terminates. Otherwise, at block 405, the method sets the value of quantum size to a new value, for example, one half the previous value of quantum size. Other embodiments may use other new values for quantum size.

If the new value of quantum size is less than the minimum value for quantum size at decision 410, the method, at block 415, sets the value of quantum size to the minimum possible value of quantum size and sets the value of quantum number to a new value, for example, half of the current value of quantum number. Other embodiments may use other new values for quantum number. If the new value of quantum number is less than the minimum possible value of quantum number at decision 420, the method sets the value of quantum number to the minimum possible value of quantum number at block 425 and terminates at block 430.

Figure 5:
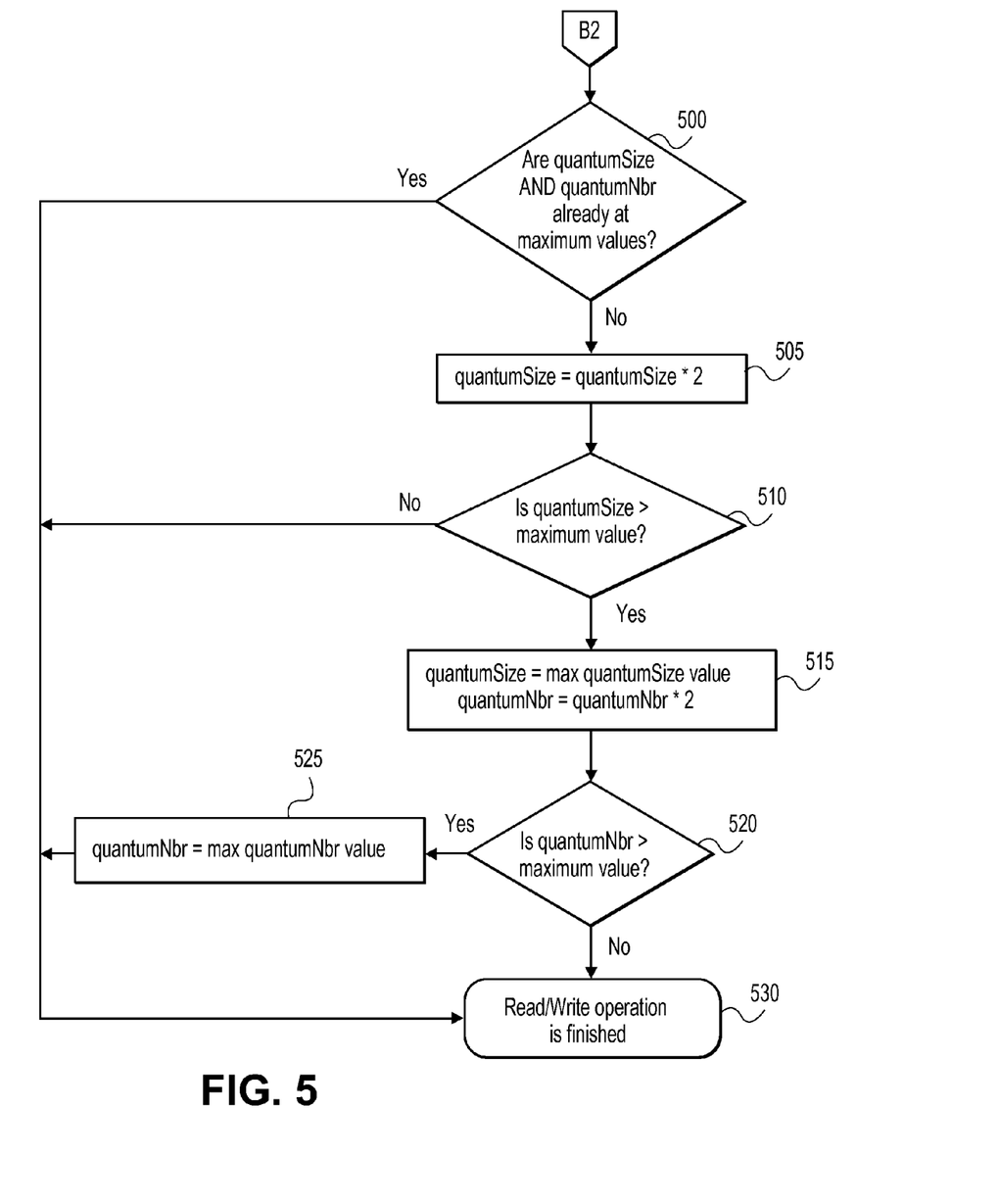

FIG. 5 illustrates an embodiment of a dynamic file streaming method in response to the average time for a single I/O operation being less than a low water mark of the corresponding single I/O operation time threshold.

If quantum size and quantum number are already at their maximum values at decision 500, the method terminates at block 530. Otherwise, the method sets quantum size to a new value at block 505. For example, twice the previous value of quantum size. If the new value of quantum size is greater than the maximum possible value of quantum size at block 510, the method sets the value of quantum size to the maximum possible value of quantum size at block 515. The method also sets the value of quantum number to twice previous value of quantum number. If the new value of quantum number is greater than the maximum possible value of quantum number at decision 520, the method, at block 525, sets the value of quantum number to the maximum value of quantum number and terminates. Otherwise, the method terminates at block 530.

Figure 6:
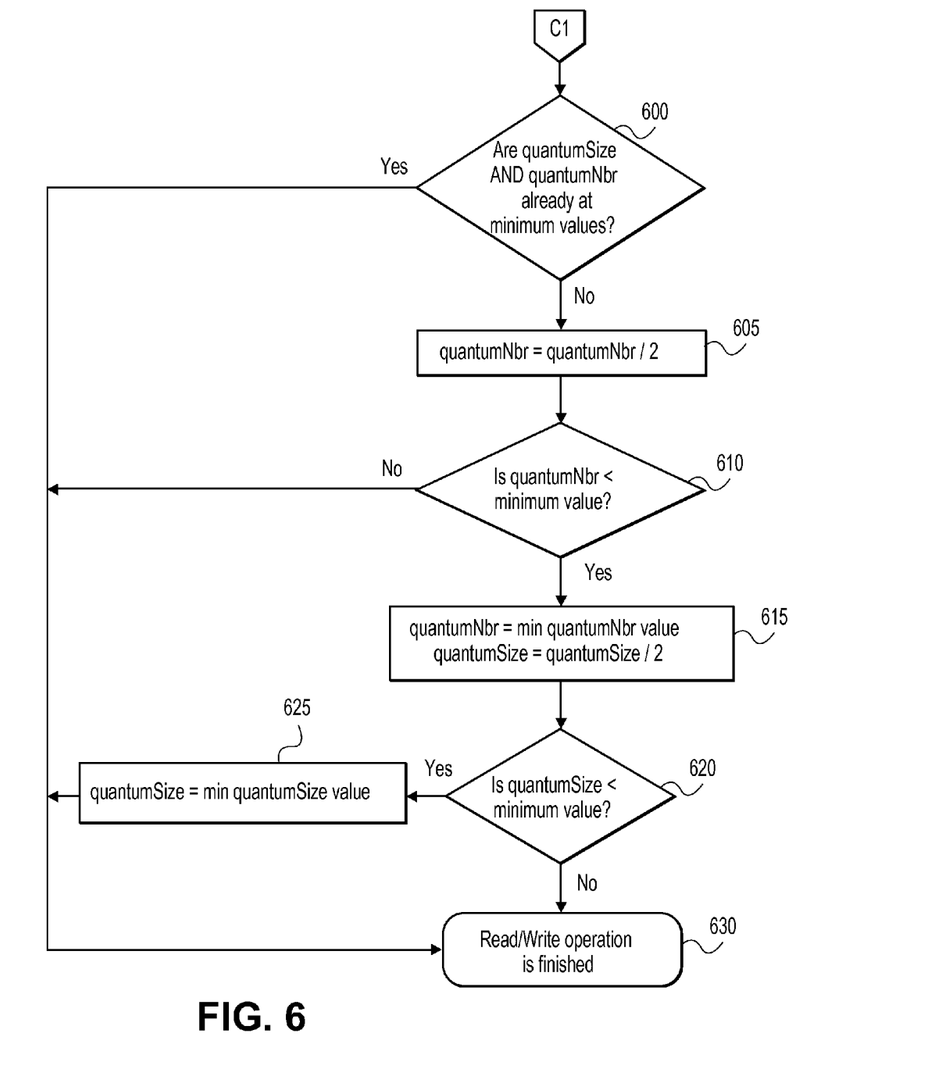

FIG. 6 illustrates an embodiment of a dynamic file streaming method in response to an average total I/O operation time exceeding a predetermined high water mark or threshold. If the quantum size and the quantum number are already at minimum predetermined values at decision 600, the method terminates. Otherwise, the method sets the value of quantum number to a new value, for example, one half the previous value of quantum number. Other embodiments may use other new values for quantum number.

If the new value of quantum number is less than the minimum value for quantum number at decision 610, the method, at block 615, sets the value of quantum number to the minimum possible value of quantum number and sets the value of quantum size to a new value, for example, half of the current value of quantum size. Other embodiments may use other new values for quantum size. If the new value of quantum size is less than the minimum possible value of quantum size at decision 620, the method sets the value of quantum size to the minimum possible value of quantum size at block 625 and terminates at block 630.

Figure 7:
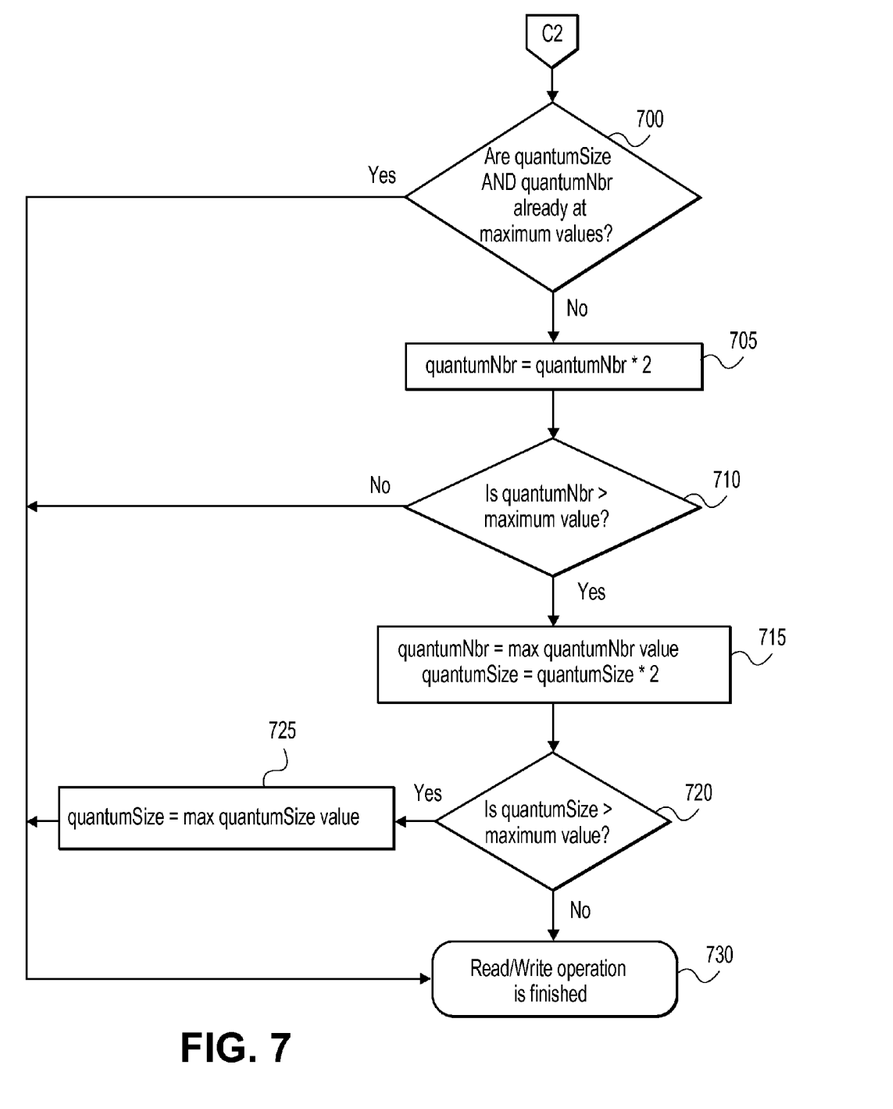

FIG. 7 illustrates an embodiment of a dynamic file streaming method in response to an average total I/O operation time being less than a low water mark of the corresponding total I/O operation time threshold.

If quantum size and quantum number are already at their maximum values at decision 700, the method terminates at block 730. Otherwise, the method sets quantum number to a new value at block 705. For example, twice the previous value of quantum number. If the new value of quantum number is greater than the maximum possible value of quantum number at decision 710, the method sets the value of quantum number to the maximum possible value of quantum number at block 715. The method also sets the value of quantum size to twice previous value of quantum size. If the new value of quantum size is greater than the maximum possible value of quantum size at decision 720, the method, at block 725, sets the value of quantum size to the maximum value of quantum size and terminates. Otherwise, the method terminates.

Figure 8:
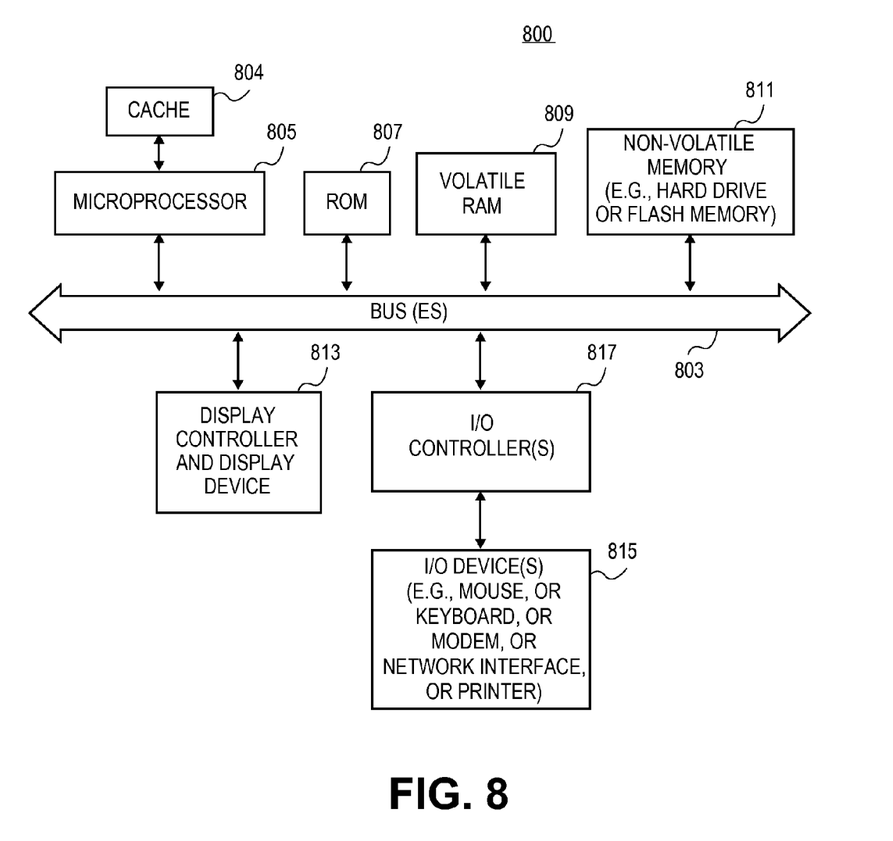
FIG. 8 is a diagram of a data processing system suitable for practicing an embodiment of the invention.

FIG. 8 shows one example of a data processing system which may be used with one embodiment the present invention. For example, the system 105 or the system 115 of FIG. 1 may be implemented as shown in FIG. 8. Note that while FIG. 8 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 is coupled to cache 804. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 813 and to peripheral devices such as input/output (I/O) devices which may be mice, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory.

The mass storage 811 is typically a magnetic hard drive or a magnetic optical drive or an optical drive or a DVD RAM or a flash memory or other types of memory systems which maintain data (e.g. large amounts of data) even after power is removed from the system. It will be appreciated that a magnetic hard drive is one of many examples of a computer readable non-transitory storage medium. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Figure 9:
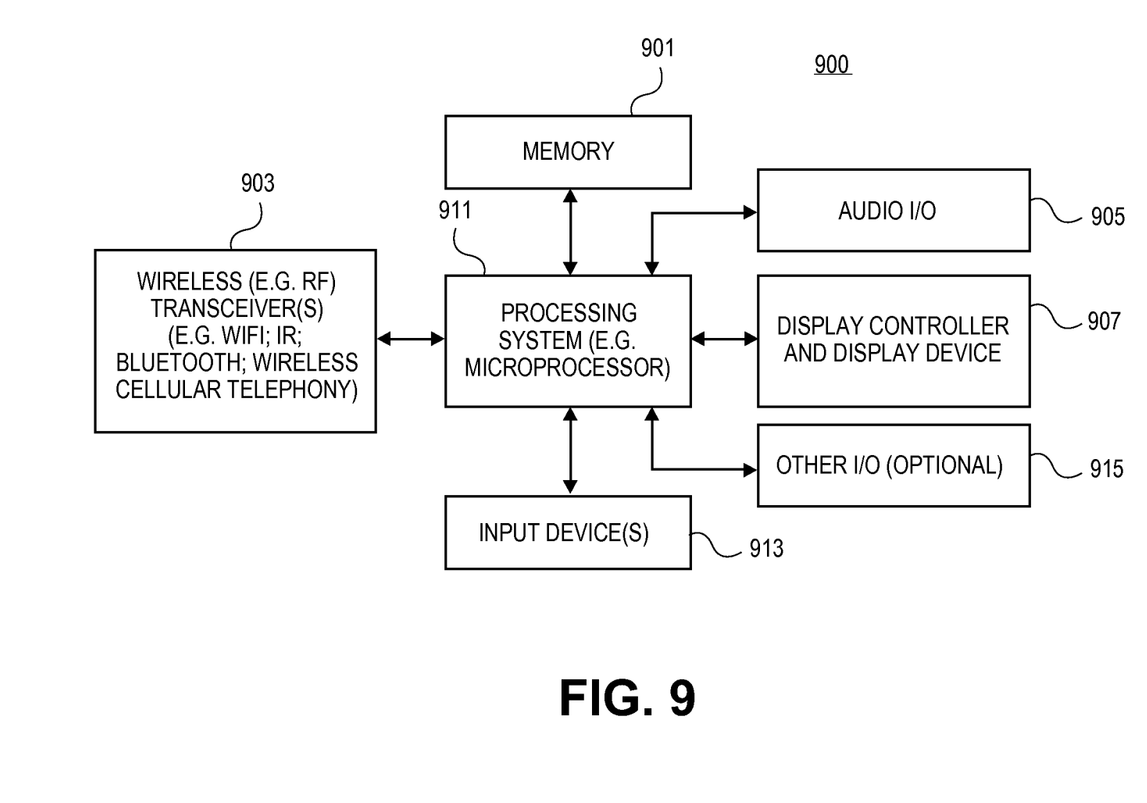
FIG. 9 is a diagram of another data processing system suitable for practicing an embodiment of the invention.

FIG. 9 shows an example of another data processing system which may be used with one embodiment of the present invention. For example, system 105 or system 115 may be implemented as shown in FIG. 9. The data processing system 900 shown in FIG. 9 includes a processing system 911, which may be one or more microprocessors, or which may be a system on a chip integrated circuit, and the system also includes memory 901 for storing data and programs for execution by the processing system. The system 900 also includes an audio input/output subsystem 905 which may include a microphone and a speaker for, for example, playing back music or providing telephone functionality through the speaker and microphone.

A display controller and display device 907 provide a visual user interface for the user; this digital interface may include a graphical user interface which is similar to that shown on a Macintosh computer when running OS X operating system software. The system 900 also includes one or more wireless transceivers 903 to communicate with another data processing system, such as the system 800 of FIG. 8. A wireless transceiver may be a WiFi transceiver, an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system.

The data processing system 900 also includes one or more input devices 913 which are provided to allow a user to provide input to the system. These input devices may be a keypad or a keyboard or a touch panel or a multi touch panel. The data processing system 900 also includes an optional input/output device 915 which may be a connector for a dock. It will be appreciated that one or more buses, not shown, may be used to interconnect the various components as is well known in the art. The data processing system shown in FIG. 9 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 900 may be a network computer or an embedded processing device within another device, or other types of data processing systems which have fewer components or perhaps more components than that shown in FIG. 9.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method, comprising:
   dividing, at a local data processing system, a read/write operation into a number of requests, wherein each of the requests has a size;
   transmitting, at the local data processing system, each of the requests to a remote data processing system;

determining, at the local data processing system, an average performance value based on a time to transmit the requests to the remote data processing system as well as the size;

determining, at the local data processing system, a user interactivity value based on at least a time between issuance of a user request within the local data processing system and processing the user request within the local data processing system;

if the average performance value is less than a first threshold, increasing, at the local data processing system, at least one of the number of requests by a first factor if the number of requests is less than a maximum number, and increasing the size by a second factor if the size is less than a maximum size; and if the user interactivity value is less than a second threshold, decreasing, at the local data processing system, at least one of the number of requests by a third factor if the number of requests is greater than a minimum number and decreasing the size by a fourth factor if the size is greater than a minimum size.

2. The method of claim 1, wherein the number of requests and the size have first values if the read/write operation is a read operation and wherein the number of requests and the size have second values if the read/write operation is a write operation.

3. The method of claim 1, wherein the local data processing system and the remote data processing system are peers in a peer to peer network.

4. The method of claim 1, wherein the number of requests specifies how many requests to transmit prior to receiving an acknowledgement.

5. The method of claim 1, wherein increasing at least one of the number of requests and the size occurs after the number of requests are transmitted.

6. The method of claim 1, wherein the first threshold and the second threshold are specified by one of the following: a user and a vendor.

7. A computer readable non-transitory storage medium storing executable instructions that, when executed by a data processing system, cause the data processing system to perform operations comprising:

breaking a read/write operation into a set of requests, wherein the set includes a first quantity of requests and each of the requests is sized according to a first size;

transmitting the set of requests to a remote system;

calculating a first length of time taken to transmit the set of requests to the remote system;

calculating, using the first length of time and the first size, an average length of time taken to send one request to the remote system;

calculating a user interactivity value based on at least a time between issuance of a user request within the data processing system and processing the user request within the data processing system;

in response to the determining that the user interactivity value is less than a first threshold, decreasing at least one of a value of the first size by a first factor if the first size is not less than a minimum size and a value of the first quantity by a second factor if the first quantity is not less than a minimum quantity; and in response to determining that the average length of time is less than a second threshold, increasing at least one of a value of the first size by a third factor if the first size is not equal to a maximum size and a value of the first quantity by a fourth factor if the first quantity is not equal to a maximum quantity.

8. The computer readable non-transitory storage medium of claim 7, wherein the first threshold corresponds to an unacceptable level of user interactivity.

9. The computer readable non-transitory storage medium of claim 8, wherein the first threshold is specified by a vendor.

10. The computer readable non-transitory storage medium of claim 7, wherein the second threshold corresponds to an unacceptable level of read/write performance.

11. A system comprising:
a processor coupled to a bus;
a memory coupled to the processor through the bus;
a communications interface coupled to the bus;
executable instructions stored in the memory which when executed by the processor cause the processor to:
receive a read/write operation,
divide the read/write operation into a plurality of read/write requests, wherein the plurality includes a quantum number of requests and each request has at least a quantum size,
transmit the plurality of read/write requests through the communication interface to a remote system, wherein a total transmission time is measured,
calculate an average single request time using the total transmission time, the quantum size, and a size of the read/write operation,
calculate a user interactivity value based on at least a time between issuance of a user request within the system and processing the user request within the system;
in response to the determining that the user interactivity value is less than a first threshold, decreasing at least one of a value of the first size by a first factor if the first size is not less than a minimum size and a value of the first quantity by a second factor if the first quantity is not less than a minimum quantity; and
in response to determining that the average single request time is less than a second threshold, increasing at least one of a value of the first size by a third factor if the first size is not equal to a maximum size and a value of the first quantity by a fourth factor if the first quantity is not equal to a maximum quantity.

12. The system of claim 11, wherein the quantum number and the quantum size are specified by a vendor.

13. An apparatus comprising:
a processor for splitting a read/write operation into a set of requests, wherein the set includes first quantity of requests and each of the requests in the set has at least a first size;
a network interface for transmitting the first set of requests to a remote system;
the processor for calculating a first length of time taken to transmit the set of requests to the remote system;
the processor for calculating, using the first length of time and the first size, an average length of time taken to send one request to the remote system;
the processor for calculating a user interactivity value based on at least a time between issuance of a user request within the apparatus and processing the user request within the apparatus;
the processor for decreasing, in response to determining that the user interactivity value is less than a first threshold, at least one of a value of the first size by a first factor if the first size is not equal to a minimum size and a value of the first quantity by a second factor if the first quantity is not less than a minimum quantity;
the processor for increasing, in response to determining that the average single request time is less than a second threshold, at least one of a value of the first size by a third factor if the first size is not equal to a maximum size and a value of the first quantity by a fourth factor if the first quantity is not equal to a maximum quantity.

14. The apparatus of claim 13, wherein the first threshold corresponds to an unacceptable level of user interactivity.

15. The apparatus of claim 13, wherein the first threshold is specified by a vendor.

16. The apparatus of claim 13, wherein the second threshold corresponds to an unacceptable level of read/write performance.

* * * * *